United States Patent [19]

Schmidt et al.

[11] 4,298,668
[45] Nov. 3, 1981

[54] ALKALINE BATTERY, ELECTROLYTE ABSORBER THEREFOR

[75] Inventors: George F. Schmidt, Neenah; Robert E. Weber, Appleton, both of Wis.

[73] Assignee: Kimberly-Clark Corporation, Neenah, Wis.

[21] Appl. No.: 165,656

[22] Filed: Jul. 3, 1980

[51] Int. Cl.³ .............................................. H01M 2/14
[52] U.S. Cl. ..................................... 429/250; 429/252
[58] Field of Search ................................ 429/247–252, 429/254, 142, 145; 427/244, 430.1

[56] References Cited

U.S. PATENT DOCUMENTS

| | | | |
|---|---|---|---|
| 3,765,948 | 10/1973 | Johnson et al. | 429/250 |
| 3,849,241 | 11/1974 | Butin et al. | 264/211 X |
| 3,985,580 | 10/1976 | Cogliano | 264/121 |
| 4,085,241 | 4/1978 | Sheibley | 429/254 |
| 4,224,393 | 9/1980 | Feinberg et al. | 429/251 |
| 4,224,394 | 9/1980 | Schmidt | 429/252 |

Primary Examiner—Anthony Skapars
Attorney, Agent, or Firm—Wendell K. Fredericks; William D. Herrick

[57] ABSTRACT

An improved electrolyte absorber for alkaline battery cells has low resistance to electrolyte ion transfer and can hold alkaline electrolyte in contact with an electrode during chemical reactions of the cell. The absorber is formed by depositing an improved wetting compositions to a polyolefin substrate. The substrate, preferably, is a fibrous and porous melt blown thermoplastic web made up of a plurality of physically entangled microfibers, resistant to strong alkali and oxidation. The wetting composition which is deposited over and adhered to external surfaces of said microfibers is comprised of a substantially homogeneous admixture of a polymeric binder, inert hydrophilic filler particles and a phosphate ester wetting agent. Portions of the filler particles in the composition protrude through the binder and are exposed in random distribution. When the absorber is immersed in electrolyte, the phosphate ester wetting agent reacts with the electrolyte to lower the surface tension thereof. The lowered surface tension permits the reacted electrolyte to rapidly wet the exposed filler particles.

11 Claims, 4 Drawing Figures

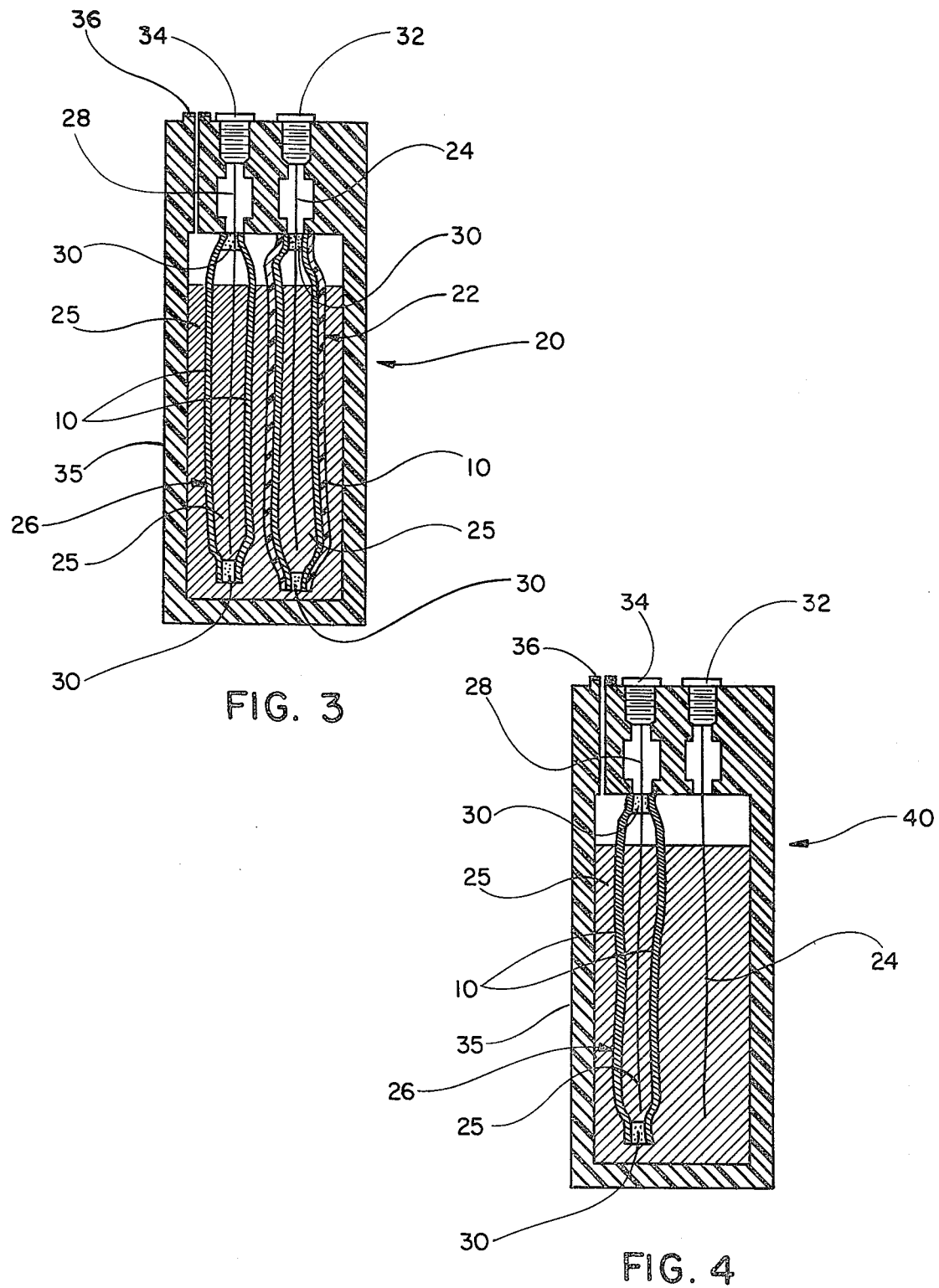

ALKALINE BATTERY, ELECTROLYTE ABSORBER THEREFOR

BACKGROUND OF THE INVENTION

1. Field of the Invention

The present invention relates generally to battery separator systems and particularly to alkaline electrolyte absorbers for use, for example, in cells of high energy density secondary alkaline batteries.

2. Description of the Prior Art

An illustrative environment where application of the principles of the present invention is particularly advantageous is in high energy density batteries such as, for example, the batteries as described in a pending patent application Ser. No. 57,329 to the present co-inventor George Schmidt "Alkaline Battery, Separator Therefore" filed July 13, 1979, now U.S. Pat. No. 4,224,394, dated Sept. 23, 1980.

The cited patent describes a battery electrolyte absorber used in conjunction with a barrier type separator in a separation system designed primarily for silver-zinc and nickel-zinc alkaline electrolyte cells. The described electrolyte absorber, which is shaped to form a housing for receiving an electrode is comprised of a fuel-cell grade asbestos sheet that is about 7 mils thick which is treated in a beater with 5% by weight of butyl latex rubber. The absorber material is capable of absorbing electrolyte, holding electrolyte in contact with a housed electrode and acting as a low resistance passageway for electrolyte ion transfer. However, as is the usual situation, the absorber material by itself does not provide a sufficient barrier to electrode ion transfer. Hence, in battery cells which utilize zinc as the negative electrode material, wherein reduction of the electrode material occurs at the negative electrode during charging and wherein dendrites of sharp tooth-like projection have a tendency to build up on the negative electrode, a barrier type separator, similar to the one as described in the cited patent application is also employed to deter migration of electrode ions and resultant growth to dendrite crystals. The tendency to form dendrites is reduced when the soluble zincate ions are retained in close proximity to the negative electrode.

However, recognizing possible environmental risks in using asbestos as a substrate the present inventor saw the need for developing a low cost, high efficient polymeric material to replace the asbestos substrate.

In one system for meeting this need, the present inventors, George Schmidt and Robert Weber, developed a barrier type separator which included a wettable melt brown thermoplastic polymer web to replace the asbestos as the separator substrate. Pending patent application Ser. No. 176,991 to Schmidt and Weber "Flexible Separators for Alkaline Batteries" filed Aug. 11, 1980, which is a continuation of Ser. No. 001,924, filed Jan. 8, 1979, now abandoned, describes such a separator.

U.S. Pat. No. 3,985,580 dated Oct. 12, 1976 to Coqliano describes a method for preparing wettable polyolefin battery separators that retain wettability over long periods of use in batteries utilizing dilute sulfuric acid as the electrolyte. The separator described in this patent is preferably a self-supporting non-woven mat of polypropylene fiber having a thickness of 10-20 mils, with a soluble surfactant and some amount of colloidal silica incorporated in the non-woven mat. However, the silica, which is a colloidal filler, is soluble in alkaline solution and the described separator will not work satisfactorily in alkaline batteries.

U.S. Pat. No. 4,072,802 dated Feb. 7, 1978 to Murata et al discloses a separator for lead-acid batteries wherein a polypropylene non-woven web is made wettable after formation with a composition consisting of polyvinyl chloride, silicon oxide and tetrahydrofuran. This material allegedly provides a suitable acid electrolyte wettability of the polyolefin.

To provide an alkali-wettable melt blown thermoplastic polymer web suitable for use as an electrolyte absorber in a battery separator system, it is desirable to minimize loss of wetting agents and wetting agent carriers which may leach out or be removed by agitation. Also, it is desirable, with a substantially permanently wettable material to employ a wetting composition which allows for rapid wetting of the material providing a very low resistance to electrolyte ion transfer.

To obtain the above-mentioned desiderata, a search for various other means to enhance the wetting characteristics of polymeric material in alkaline batteries was initiated. This search resulted in the improved product of the present invention.

SUMMARY OF THE INVENTION

The present invention is directed to an improved electrolyte absorber of an electrode separation system for use in an alkaline battery cell to hold electrolyte in contact with a housed electrode and to act as a low resistance passageway for electrolyte ion transfer.

The improved absorber includes a flexible fibrous substrate and an improved wetting composition adhered thereto. The substrate material which is shaped to form a housing for receiving an electrode is preferably a flexible, fibrous, and porous melt blown polymeric web resistant to strong alkali and oxidation. The housing formed by the web is sealed along cut edges with an alkali-resistant adhesive. However, because of the hydrophobic nature of polyolefin the melt blown polymeric web without modification does not wet when disposed in an aqueous media, hence it is necessary to employ means for making the substrate wettable and also to provide a structure which will remain substantially permanently wet in alkaline electrolyte.

The means for making the melt blown web wettable involves the use of a composition which includes an admixture of a polymeric binder, an inert filler, and a wetting agent. One suitable polymeric binder is butyl latex rubber. One suitable filler is kaolin clay. An especially suitable class of wetting agents is the potassium salt of organic polyphosphoric esters.

When the admixture is prepared, the wetting agent and the hydrophilic filler material are dispersed homogeneously throughout the binder material.

The admixed composition is deposited over the fibers of the substrate by saturation techniques. The physical structure of the filler material is disposed to a great extent over the surface of substantially every fiber of the web forming random hydrophilic sites throughout the web.

When the thus-coated absorber material is immersed in, for example 45% potassium hydroxide (KOH), a modified electrolyte is formed upon interaction with the wetting agent contained in the wetting composition. This modified electrolyte which contacts the absorber has a lower surface tension than the original 45% KOH. Hence the randomly dispersed hydrophilic sites wet at a higher rate of wetting than the sites would otherwise wet in the original unmodified 45% KOH.

The deposits of this wetting composition on the fibers are such that interstices between the fibers remain sufficiently large to render the absorber material highly permeable to the alkaline electrolyte. The absorber material thus remains substantially permanently wetted when immersed in KOH electrolyte.

BRIEF DESCRIPTION OF THE DRAWING

Referring to the drawing figures, in which like numerals represent like parts in the several views:

FIG. 3 is a cross section view of a nickel-zinc couple alkaline battery cell employing an absorber of the present invention housing a first electrode and a barrier protection separator housing a second electrode.

FIG. 4 is a cross section view of a nickel-cadmium couple alkaline battery cell employing the absorber of the present invention which serves both as an absorber and a separator.

DETAILED DESCRIPTION OF THE PREFERRED EMBODIMENT

Figure 1:
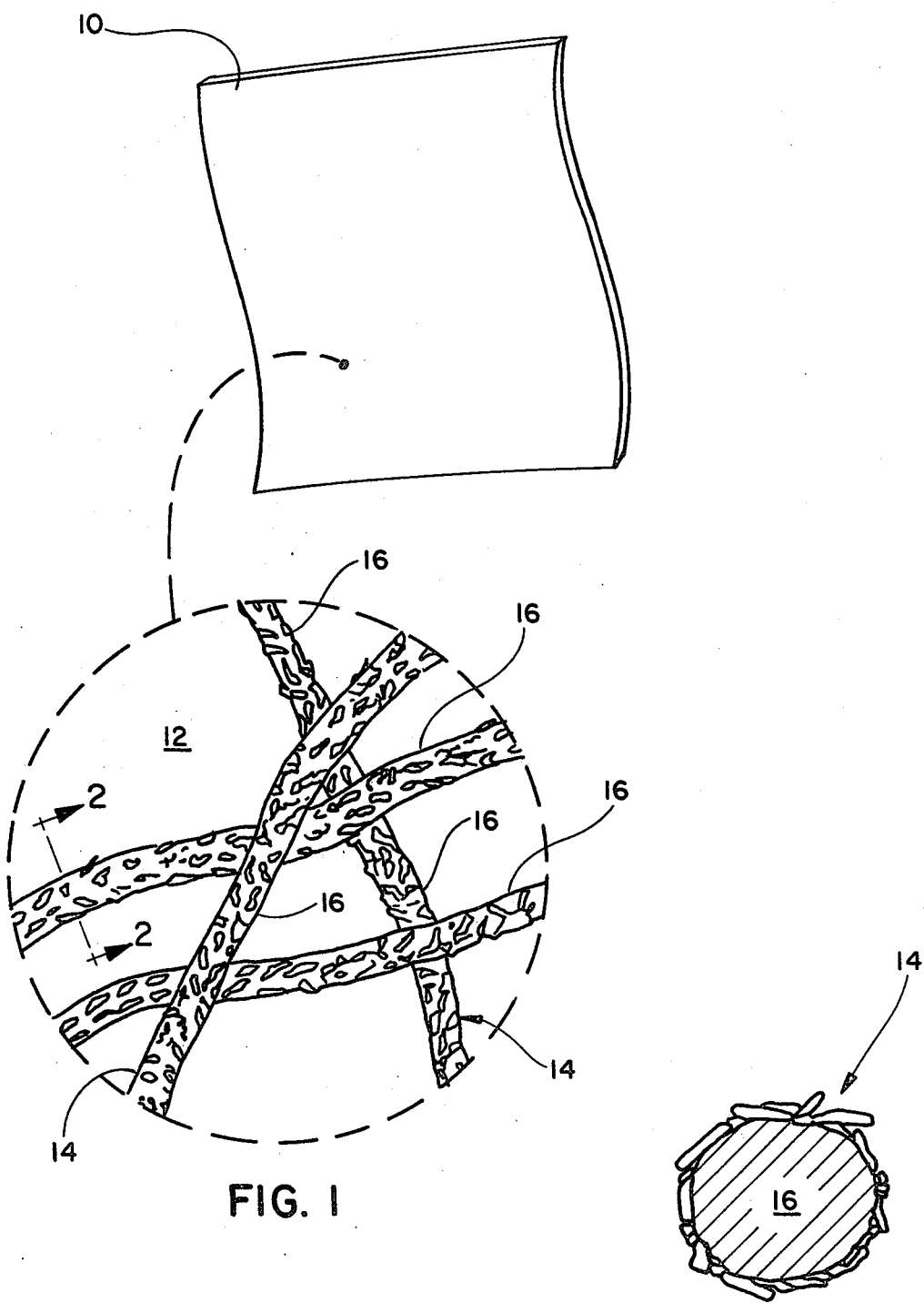
FIG. 1 is a microscopic illustration of a portion of a sheet of the absorber material of this invention.

Referring to the drawing figures, FIG. 1 shows a 3000× magnified view of a portion of an absorber 10 in accordance with the present invention. Absorber 10 includes a fibrous polymeric substrate 12, and a deposited wetting composition 14 adhered to the surface of fibers 16—16 throughout the substrate 12.

In the preferred embodiment, substrate 12 is comprised of a meltbrown polypropylene web as described in U.S. Pat. No. 3,849,241 of Butin et al having a basis weight in the range of from about 15 $gm/m^2$ to about 100 $gm/m^2$ and bonded primarily by physical entanglement to provide a strength of about 1.5 lbs./in. width in the machine direction while maintaining good flexibility. The meltblown web has relatively small pores but a relatively high void volume, i.e. areas not occupied by fibers. This high void volume provides many capillary regions for retaining electrolyte. However, such a web, without modification, is quite hydrophobic and cannot absorb and hold KOH electrolyte.

Wetting composition 14, deposited over the external surface of microfibers 16 by conventional saturating means, modifies the meltblown web of polyolefin fibers by reducing the critical surface tension of substrate 12 with respect to the surface tension of a solution of 45% KOH electrolyte. Upon drying, substrate 12 with the wetting composition 14 deposited thereon becomes absorber 10 which is now a hydrophilic material and remains so as long as absorber 10 is immersed in KOH electrolyte.

In a preferred embodiment, composition 14 is comprised of 16.5% of a latex rubber binder, 66% of an inert filler insoluble in alkaline electrolyte, and 17.5% of a wetting agent. The latex binder is an oxidation-resistant rubbery material sold under the trade name Butyl Latex 100 by Burke Palmason Chemical Company of Pompano Beach, Florida. The inert filler is kaolin clay, in this instance a hydrophilic pigment sold under the trade name Ultra White 90 by Engelhard Minerals and Chemical Corp. of Edison, N.J. The chosen wetting agent is from the class of phosphate ester surfactants comprising a potassium salt of a complex organic polyphosphoric ester. The particular wetting agent used is sold under the trade name Strodex PK90 by the Dexter Chemical Co. of Bronx, New York.

The above described absorber 10 when made from a 30 $gm/m^2$ melt blown polypropylene web, was found to have a volume resistivity of 2 ohms—cm in 45% KOH electrolyte, and wetted substantially completely within 1 minute at room temperature.

It is appreciated by those skilled in the art that subjecting the absorber material to the above described wettability test is a useful indicator as to the performance of the material when it is employed as an absorber in working cells of an alkaline battery.

In addition to the embodiment described above, other materials suitable for use as substrate material in this invention may include any polymeric web material resistant to strong alkali and comprised preferably of micro-diameter fibers. The substrate may have a thickness in the range of about 5 to 20 mils and a basis weight in the range of 15 to 200 $gm/m^2$.

Ionomer dispersions may also be used as suitable alternatives for the latex binder of butyl latex rubber mentioned previously. While butyl latex rubber binder may present minor blocking problems when sheets of absorber material are stored, there are other binders (e.g. polyethylene and ionomers) that avoid blocking.

Depending on the thickness of the substrate used for absorber material, these binders may comprise from about 12 to 30% of the rewettable composition. While these saturating compositions work equally well from an aqueous or solvent base system, it is preferable that the binder be applied from an aqueous system because of environmental and cost considerations.

It is believed that the entire class of surfactants that are based on phosphate esters are particularly suitable. Other common classes of commercially important surfactants, e.g. the sulfonates and sulfates, as well as many nonionic types are also effective as wetting agent but to a lesser degree than those mentioned above. The wetting agent may comprise from 5 to 17% by weight of the wetting composition.

Other suitable inert fillers, in addition to that named in the preferred embodiment, may be selected from the group consisting of inorganic materials such as metallic oxides, titanates, silicates, and the like, and may be powered or fibrous particles of a suitable size. Also depending on which substrate material is employed, these alternate fillers may comprise from about 60% to 80% by weight of the wetting composition.

In preparing the wetting composition, the inert fillers are first finely dispersed in water with the aid of a colloid mill. The wetting agent is added gradually while the filler dispersion is stirred with a low shear mixer. The polymeric binder is then added and the combination is again thoroughly stirred to form a smooth mixture.

Figure 2:
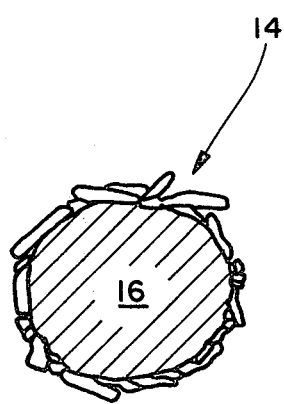
FIG. 2 is a microscopic illustration of a cross-section of a fiber of the absorber material of FIG. 1.

In depositing the composition about the surface of the fibers a substrate 12, a suitable conventional saturation method may be used. The mixture is diluted with water to establish a level of total solid which will result in deposition of 10 to 40 parts of the saturant solids to 100 parts of fiber. Typical levels of solids in the range of 5–12% are suitable. After the mixture is applied to the fibers of the substrate, it may be allowed to dry at room temperature, but preferably, the saturated substrate is force dried with heat or other suitable means to accelerate the drying process. In final form, portions of the filler material protrude through the layer of latex rubber binder material forming random hydrophilic sites about the surface of substantially every fiber of substrate 12 as best seen in FIG. 2 which is an enlarged cross-sectional illustration of a microfiber 16 with the wetting composition 14 disposed about the surface of the fiber.

The preferred embodiment of absorber material 10 has the following structure and properties: (1) microscopic interstices between the fibers sufficiently large to make the fibrous material very permeable to the electrolyte; (2) high capillary retention as well as surface retention of electrolyte; (3) homogeneous diffusion of the composition materials throughout the web; (4) rapid wetting of the fibers so as to provide minimum electrical resistance; and (5) strong resistance to decomposition throughout the useful life of the material.

Illustratively, upon immersion of absorber 10 in KOH electrolytes in forming a battery cell, the surface tension of the electrolyte in contact with absorber 10 is lowered by the wetting agent in composition 14. The potassium salt wetting agent goes partially into solution, forming a modified potassium hydroxide electrolyte solution. The wetting agent reduces the surface tension of the modified KOH electrolyte.

The reduced surface tension of the modified KOH electrolyte causes filler sites disposed about fibers 16—16 to wet at a substantially faster rate than the rate that the unmodified 45% KOH would otherwise react. This fast wetting of the sites rapidly lowers the resistance of absorber 10.

Once the clay or other selected filler sites are wetting and as long as the absorber 10 is kept in electrolyte, absorber 10 will remain wet, i.e. in will not dewet after long exposure in electrolyte.

These filler sites upon wetting also retain electrolyte. Thus, there is virtually no tendency for absorber 10 to dewet. Surprisingly, by having these filler sites wetted with the modified solution, the wetting characteristic is maintained substantially permanently. If only the wetting agent from the above mentioned phosphate esters were to be employed to effect wetting of the substrate, without the assistance of the prescribed fillers, absorber 10 would dewet within a reasonably short period of time.

The binder adhering the filler sites to the surface of the microfibers is virtually unaffected by the alkaline electrolyte as well as the amount of mechanical agitation usually generated in the battery cells during battery charging or discharging and during related wetting operations.

When battery cells of the type which may include electrode couples of nickel-zinc materials are manufactured, a complete separation system, i.e. both an absorber and a barrier type separator, is employed. Such a system is usually employed because electrode ions from the zinc electrode are soluble in electrolyte and must be confined to the vicinity of the electrode so that the ions are readily available for reconversion to metal during charging. However, when nickel-cadmium cells are built, only an absorber of the type of the present invention is necessary for providing the separation of the electrodes. This is so because, cadmium electrode ions do not possess the solubility characteristics in electrolyte as do the zinc electrode ions.

With reference to FIG. 3, there is illustrated in exaggerated size for illustrative purposes a cross-section of a nickel-zinc alkaline cell 20 comprising a container 35 with a barrier type separator housing 22 disposed about a negative electrode 24 and an absorber housing 26 disposed about a positive electrode 28. Separator housing 22 comprises a pair of battery separators of a suitable material (as disclosed in pending patent application Ser. No. 51,329 now U.S. Pat. No. 4,224,394 of the present inventor). The separators are sealed along the edges by an alkali resistant sealer 30 to form the housing. Absorber housing 26, similarly constructed, comprises a pair of absorber sheets 10—10 of FIG. 1. In cell 20, the negative electrode 24 is enclosed in separator housing 22 since reduction occurs at the negative electrode during charging and dentrites with sharp tooth-like projections can build up on the negative electrode. Absorber housing 26 may be used to enclose the positive electrode during charging of the cell. The electrodes 28 and 24 are suitably electrically connected to negative and positive terminals 34 and 32 respectively to form opposite polarity cell output terminals. The electrodes and housings are partially immersed in a solution of electrolytes 25, preferably a 35–45% solution of potassium hydroxide. A port 36 is provided to permit venting excess gas which might develop during charging and to provide an access aperture for adding electrolyte.

Referring now to FIG. 4, there is shown also in exaggerated size for illustrative purposes a cross-section of a nickel-cadmium alkaline cell 40. The components of cell 30 are comparable with the silver-zinc cell 20 except that the negative electrode is now a cadmium electrode 24 and the barrier type separator is omitted since cadmium electrode ions do not migrate as do the zinc electrode ions.

It is to be understood that the above-described embodiments are mainly illustrative of the principles of the invention. One skilled in the art may make changes and modifications to the embodiments without departing from the scope and the essential characteristics therefore.

What is claimed is:

1. An improved electrolyte absorber for use in an alkaline battery cell for physically separating electrodes of said cell and for holding alkaline electrolyte in contact with an electrode during chemical reactions of said cell, in which said absorber comprises a flexible and fibrous polyolefin substrate made up of a plurality of physically entangled microfibers, resistant to strong alkali and oxidation with said substrate being permeable to electrolyte ion transfer, said improvement comprising:
   a wetting composition deposited over and adhered to external surfaces of said microfibers, said composition comprising a substantially homogeneous admixture of:
   1. a polymeric binder;
   2. inert hydrophilic filler particles; and
   3. a phosphate ester wetting agent;
the polymeric binder in said composition substantially covering the external surfaces of said microfibers with portions of said filler particles being exposed and protruding through said binder in random distribution, said wetting agent being of the type which when immersed in and in contact with said alkaline electrolyte reacts with said electrolyte to lower the surface tension thereof, said lowered surface tension permitting said reacted electrolyte to rapidly wet said exposed filler particles, the wetting of said filler particles being substantially permanent while immersed in said electrolyte.

2. An absorber in accordance with claim 1, wherein said binder is selected from the group consisting of butyl latex rubber and ethylene propylene terpolymer.

3. An absorber in accordance with claim 1, wherein said phosphate ester wetting agent is a potassium salt of a complex organic polyphosphoric ester.

4. An absorber in accordance with claim 1, wherein said inert filler particles are powdered or fibrous and are selected from the group consisting of kaolin clays, metallic oxides, titanates and silicates of a suitable size wherein said fillers are substantially insoluble in alkaline electrolyte.

5. An absorber in accordance with claim 4, wherein said composition is comprised of from about 15 to 18 percent by weight of said binder, from about 61 to 74 percent by weight of said inert filler, and from about 8 to 17 percent by weight of said wetting agent.

6. An electrolyte absorber for physically separating electrodes immersed in a solution of alkaline electrolyte in a battery cell, and for holding the electrolyte in contact with an electrode during chemical reactions within said cell, comprising:
   a. a flexible and fibrous polyolefin substrate comprised of a plurality of physically entangled microfibers;
   b. a wetting composition deposited upon and adhered to external surfaces of said microfibers, said composition comprising of an admixture of:
      1. a polymeric binder;
      2. inert hydrophilic fillers; and
      3. a phosphate ester wetting agent,
the polymeric binder in said composition substantially covering the external surfaces of said microfibers with portions of said filler particles being exposed and protruding through said binder in random distribution, said wetting agent being of the type which when immersed in and in contact with said alkaline electrolyte reacts with said electrolyte to lower the surface tension thereof, said lowered surface tension permitting said reacted electrolyte to rapidly wet said exposed filler particles, the wetting of said filler particles being substantially permanent while immersed in said electrolyte.

7. The electrolyte absorber of claim 6, wherein said substrate is a web of entangled microfibers, wherein said wetting composition is adhered to external surfaces of said microfibers, wherein said substrate with said composition adhered thereon is sealed along cut edges with an alkali resistant adhesive, and wherein microscopic interstices between fibers are sufficiently large to be permeable to said electrolyte.

8. The electrolyte absorber of claim 6, wherein said wetting composition is comprised of from about 15 to 18% by weight of said binder, from about 61 to 74% by weight of said inert filler and from about 8 to 17% by weight of said wetting agent.

9. The electrolyte absorber of claim 8, wherein said binder is a butyl latex rubber, said phosphate ester wetting agent is a potassium salt of a complex organic polyphosphoric ester while said inert fillers are selected from the group consisting of titanates, silicates and metallic oxides, of a suitable size, said fillers being substantially insoluble in alkaline electrolyte.

10. An electrolyte absorber in accordance with claim 9, wherein said rubber binder is ethylene propylene terpolymer.

11. An electrolyte absorber in accordance with claim 7 wherein said substrate is a melt blown polypropylene web having a basis weight of from about 15 grams/m$^2$ to about 100 grams/m$^2$ and bonded primarily by physical entanglement to provide a strength of about 1.5 lbs. per inch width in the machine direction while maintaining good flexibility.

* * * * *